United States Patent
Aggarwal et al.

(10) Patent No.: US 12,314,976 B2
(45) Date of Patent: *May 27, 2025

(54) SYSTEM, METHOD, AND COMPUTER PROGRAM PRODUCT FOR GENERATING A SYNTHETIC CONTROL GROUP

(71) Applicant: Visa International Service Association, San Francisco, CA (US)

(72) Inventors: Pulkit Aggarwal, Mountain View, CA (US); Paul Max Payton, San Carlos, CA (US); Lace Cheung, San Francisco, CA (US); Suresh Krishna Vaidyanathan, Dublin, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,669

(22) Filed: Aug. 28, 2023

(65) Prior Publication Data

US 2023/0401601 A1  Dec. 14, 2023

Related U.S. Application Data

(63) Continuation of application No. 17/697,183, filed on Mar. 17, 2022, now Pat. No. 11,776,005, which is a
(Continued)

(51) Int. Cl.
*G06Q 30/0242* (2023.01)
*G06Q 30/0201* (2023.01)
*G06Q 30/0202* (2023.01)

(52) U.S. Cl.
CPC ..... *G06Q 30/0244* (2013.01); *G06Q 30/0201* (2013.01); *G06Q 30/0202* (2013.01)

(58) Field of Classification Search
None
See application file for complete search history.

(56) References Cited

U.S. PATENT DOCUMENTS

| | | |
|---|---|---|
| 2011/0231225 A1 | 9/2011 | Winters |
| 2018/0068331 A1 | 3/2018 | Bernard et al. |

(Continued)

OTHER PUBLICATIONS

D. Ros Hodgekiss, "The Ideal Email Frequency", available on Jun. 4, 2019, retrieved from https://www.campaignmonitor.com/blog/email-marketing/the-ideal-email-frequency/ (Year: 2019).*

(Continued)

*Primary Examiner* — Sam Refai
(74) *Attorney, Agent, or Firm* — The Webb Law Firm (57) ABSTRACT

Described are a system, method, and computer program product for generating a synthetic control group. The method includes receiving transaction data associated a first set of transaction accounts in a first time period and generating a synthetic control group including a subset of transaction accounts. The method also includes determining, for each transaction account of the synthetic control group, a propensity score representative of a likelihood of said transaction account being associated with a test group, and a predictive spending score for a second time period. The method further includes balancing the synthetic control group and altering at least one operational parameter of a computer-implemented advertisement program to be executed in a second time period based on the transaction data and the synthetic control group. The method further includes executing the computer-implemented advertisement program in the second time period based on the at least one operational parameter that was altered.

20 Claims, 5 Drawing Sheets

Related U.S. Application Data continuation of application No. 16/801,653, filed on Feb. 26, 2020, now Pat. No. 11,308,515.

(56) References Cited

U.S. PATENT DOCUMENTS

| | | | |
|---|---|---|---|
| 2019/0295123 A1* | 9/2019 | Magnuson-Skeels | ........................ G06F 16/24578 |
| 2020/0074497 A1* | 3/2020 | Miller | ................ G06Q 30/0272 |
| 2021/0090694 A1* | 3/2021 | Colley | .................. G16B 30/00 |

OTHER PUBLICATIONS

Albouy, "Program Evaluation and the Difference in Difference Estimator", Economics 131, Session Notes, pp. 1-4.

Bessi, "Two samples test for discrete power-law distributions", Statistics Surveys, 2006, pp. 1-6, vol. 0.

Blevins Primeau, "Synthetic Control Arm Replicates Outcomes From Historical Data", Cancer Therapy Advisor, Jun. 5, 2019, pp. 1-2.

Clauset et al., "Power-Law Distributions in Empirical Data", SIAM Review, 2009, pp. 661-703, vol. 51:4, Society for Industrial and Applied Mathematics.

Hainmueller, "Entropy Balancing for Causal Effects: A Multivariate Reweighting Method to Produce Balanced Samples in Observational Studies", Political Analysis, Oct. 16, 2011, pp. 25-46, vol. 20, Society for Political Methodology.

Hodgekiss, "The Ideal Email Frequency", available on Jun. 4, 2019, retrieved from https://www.campaignmonitor.com/blog/email-marketing/the-ideal-email-frequency/.

McClelland et al., "The Synthetic Control Method as a Tool to Understand State Policy", Mar. 2017, pp. 1-46, Urban Institute.

Pulkstenis, "Synthetic control arm: the end of placebos?", AbbVie, Mar. 8, 2019, pp. 1-12.

Rooney, "Evaluating the Impact of Promotions without Randomly Assigned Control Groups", BeyeNETWORK, Jun. 11, 2009, pp. 1-13.

Sawitsky, "Control Groups: What Are They & Why You Should Use Them", Localytics, Sep. 20, 2016, pp. 1-4.

Statistical Significance and Credibility in Marketing, Optimove, updated Aug. 2019, pp. 1-8.

Synthetic control method, Wikipedia, Dec. 17, 2019, pp. 1-2.

Yakuel, "How to Treat Every Customer Campaign as a Marketing Experiment", Optimove, Apr. 17, 2013, pp. 1-20.

\* cited by examiner

SYSTEM, METHOD, AND COMPUTER PROGRAM PRODUCT FOR GENERATING A SYNTHETIC CONTROL GROUP

CROSS REFERENCE TO RELATED APPLICATION

This application is a continuation of U.S. patent application Ser. No. 17/697,183, filed Mar. 17, 2022, entitled "System, Method, and Computer Program Product for Generating a Synthetic Control Group", which is a continuation of U.S. patent application Ser. No. 16/801,653, filed Feb. 26, 2020, entitled "System, Method, and Computer Program Product for Generating a Synthetic Control Group," now U.S. Pat. No. 11,308,515, issued Apr. 19, 2022, the disclosures of which are hereby incorporated by reference in their entireties.

BACKGROUND

1. Technical Field

Disclosed embodiments or aspects relate generally to machine-learning models for automatically managed computer networks, and, in one particular embodiment or aspect, to a system, method, and computer program product for generating a synthetic control group.

2. Technical Considerations

To analyze the effectiveness of computer-driven communication programs, it is often necessary to compare an exposed group of communication recipients, e.g., a test group or experimental group, to a non-exposed group, e.g., a control group. Variances in trackable behavior, e.g., deltas, in the experimental group compared to the control group may be attributable to having received the communications. Difference in differences (DID) techniques use data measured from a known exposed group and a known non-exposed group at two or more different time periods.

There may be several technical drawbacks to DID test and control group analysis of computer-driven communications. First, such a set up may require additional computer resources (e.g., processing capacity, memory space, etc.) to identify and track an independent control group before and after exposure of communications to the experimental group. Because DID techniques require identification and tracking of two independent groups from multiple time periods, additional computer resources are required for data observation.

There is a need in the art for a synthetic control group system and method of analyzing and configuring computer-driven communication programs, such as computer-implemented advertisement programs, to increase efficiency and reduce network requirements for data collection, analysis, and program reconfiguration.

SUMMARY

Accordingly, and generally, provided is an improved system, method, and computer program product for generating a synthetic control group. The method includes receiving transaction account data and transaction data associated with transactions completed by a first set of transaction accounts with a target merchant. The method includes generating a synthetic control group including a subset of transaction accounts sampled from the first set of transaction accounts. The method includes determining, for each transaction account of the synthetic control group, a propensity score. The method includes assigning an entropy balancing weight to each transaction account of the synthetic control group. The method includes altering, based on the synthetic control group, at least one operational parameter of a computer-implemented advertisement program to be executed.

According to some non-limiting embodiments or aspects, provided is a computer-implemented method for generating a synthetic control group. The method may include receiving, with at least one processor, transaction account data of a plurality of transaction accounts in a first time period. The method may also include receiving, with at least one processor via a transaction service provider system, transaction data associated with at least one transaction completed by a first set of transaction accounts of the plurality of transaction accounts with at least one target merchant in a second time period. The method may further include generating, with at least one processor, a synthetic control group including a subset of transaction accounts sampled from the first set of transaction accounts. The method may further include determining, with at least one processor using a machine learning model, for each transaction account of the synthetic control group, a propensity score representative of a likelihood of being associated with a test group. The method may further include assigning, with at least one processor based at least partly on the propensity score of each transaction account and historic transaction data, an entropy balancing weight to each transaction account of the synthetic control group. The method may further include altering, with at least one processor based on the transaction data and the synthetic control group, at least one operational parameter of a computer-implemented advertisement program to be executed in a third time period.

In some non-limiting embodiments or aspects, determining the propensity score for each transaction account of the synthetic control group may be based on at least one of: amount transacted with merchant; amount transacted for merchant type; amount transacted for transaction type; amount transacted in first time period; amount transacted in second time period; or any combination thereof.

In some non-limiting embodiments or aspects, the entropy balancing weight assigned to each transaction account of the synthetic control group may be further based on a respective propensity score of the transaction account. The propensity score may be further determined, with at least one processor using a machine learning model, for each transaction account of the test group.

In some non-limiting embodiments or aspects, the method may also include determining, with at least one processor and using a machine learning model, for each transaction account of the synthetic control group and the test group, a predictive spending score for the third time period. The entropy balancing weight assigned to each transaction account of the synthetic control group may be further based on a respective predictive spending score of the transaction account.

In some non-limiting embodiments or aspects, the at least one operational parameter of a computer-implemented advertisement program may include at least one of: number of communications to be transmitted; time of communications to be transmitted; list of addresses of communications to be transmitted; or any combination thereof. An allocation of computing resources of the computer-implemented advertisement program may be based at least partly on the at least one operational parameter.

According to some non-limiting embodiments or aspects, provided is a system for generating a synthetic control group including a server including at least one processor. The server may be programmed and/or configured to receive transaction account data of a plurality of transaction accounts in a first time period. The server may also be programmed and/or configured to receive, via a transaction service provider system, transaction data associated with at least one transaction completed by a first set of transaction accounts of the plurality of transaction accounts with at least one target merchant in a second time period. The server may further be programmed and/or configured to generate a synthetic control group including a subset of transaction accounts sampled from the first set of transaction accounts. The server may further be programmed and/or configured to determine, using a machine learning model, for each transaction account of the synthetic control group, a propensity score representative of a likelihood of being associated with a test group. The server may further be programmed and/or configured to assign, based at least partly on the propensity score each transaction account and historic transaction data, an entropy balancing weight to each transaction account of the synthetic control group. The server may further be programmed and/or configured to alter, based on the transaction data and the synthetic control group, at least one operational parameter of a computer-implemented advertisement program to be executed in a third time period.

In some non-limiting embodiments or aspects, the entropy balancing weight assigned to each transaction account of the synthetic control group may be further based on a respective propensity score of the transaction account. The propensity score may be further determined, using a machine learning model, for each transaction account of the test group.

In some non-limiting embodiments or aspects, the server may be further programmed and/or configured to determine, using a machine learning model, for each transaction account of the synthetic control group and the test group, a predictive spending score for the third time period. The entropy balancing weight assigned to each transaction account of the synthetic control group may be further based on a respective predictive spending score of the transaction account.

In some non-limiting embodiments or aspects, the at least one operational parameter of a computer-implemented advertisement program may include at least one of: number of communications to be transmitted; time of communications to be transmitted; list of addresses of communications to be transmitted; or any combination thereof. An allocation of computing resources of the computer-implemented advertisement program may be based at least partly on the at least one operational parameter.

According to some non-limiting embodiments or aspects, provided is a computer program product for generating a synthetic control group including at least one non-transitory computer-readable medium including program instructions that, when executed by at least one processor, cause the at least one processor to receive transaction account data of a plurality of transaction accounts in a first time period. The program instructions may further cause the at least one processor to receive, via a transaction service provider system, transaction data associated with at least one transaction completed by a first set of transaction accounts of the plurality of transaction accounts with at least one target merchant in a second time period. The program instructions may further cause the at least one processor to generate a synthetic control group including a subset of transaction accounts sampled from the first set of transaction accounts. The program instructions may further cause the at least one processor to determine, using a machine learning model, for each transaction account of the synthetic control group, a propensity score representative of a likelihood of being associated with a test group. The program instructions may further cause the at least one processor to assign, based at least partly on the propensity score of each transaction account and historic transaction data, an entropy balancing weight to each transaction account of the synthetic control group. The program instructions may further cause the at least one processor to alter, based on the transaction data and the synthetic control group, at least one operational parameter of a computer-implemented advertisement program to be executed in a third time period.

In some non-limiting embodiments or aspects, the entropy balancing weight assigned to each transaction account of the synthetic control group may be further based on a respective propensity score of the transaction account. The propensity score may be further determined, using a machine learning model, for each transaction account of the test group.

In some non-limiting embodiments or aspects, the program instructions may further cause the at least one processor to determine, using a machine learning model, for each transaction account of the synthetic control group and the test group, a predictive spending score for the third time period. The entropy balancing weight assigned to each transaction account of the synthetic control group may be further based on a respective predictive spending score of the transaction account.

In some non-limiting embodiments or aspects, the at least one operational parameter of a computer-implemented advertisement program may include at least one of: number of communications to be transmitted; time of communications to be transmitted; list of addresses of communications to be transmitted; or any combination thereof. An allocation of computing resources of the computer-implemented advertisement program may be based at least partly on the at least one operational parameter.

Other non-limiting embodiments or aspects of the present disclosure will be set forth in the following numbered clauses:

Clause 1: A computer-implemented method comprising: receiving, with at least one processor, transaction account data of a plurality of transaction accounts in a first time period; receiving, with at least one processor via a transaction service provider system, transaction data associated with at least one transaction completed by a first set of transaction accounts of the plurality of transaction accounts with at least one target merchant in a second time period; generating, with at least one processor, a synthetic control group comprising a subset of transaction accounts sampled from the first set of transaction accounts; determining, with at least one processor using a machine learning model, for each transaction account of the synthetic control group, a propensity score representative of a likelihood of being associated with a test group; assigning, with at least one processor based at least partly on the propensity score of each transaction account and historic transaction data, an entropy balancing weight to each transaction account of the synthetic control group; and altering, with at least one processor based on the transaction data and the synthetic control group, at least one operational parameter of a computer-implemented advertisement program to be executed in a third time period.

Clause 2: The computer-implemented method of clause 1, wherein determining the propensity score for each transaction account of the synthetic control group is based on at least one of: amount transacted with merchant; amount transacted for merchant type; amount transacted for transaction type; amount transacted in first time period; amount transacted in second time period; or any combination thereof.

Clause 3: The computer-implemented method of clause 1 or clause 2, wherein the entropy balancing weight assigned to each transaction account of the synthetic control group is further based on a respective propensity score of the transaction account.

Clause 4: The computer-implemented method of any of clauses 1-3, wherein the propensity score is further determined, with at least one processor using a machine learning model, for each transaction account of the test group.

Clause 5: The computer-implemented method of any of clauses 1-4, further comprising determining, with at least one processor and using a machine learning model, for each transaction account of the synthetic control group and the test group, a predictive spending score for the third time period.

Clause 6: The computer-implemented method of any of clauses 1-5, wherein the entropy balancing weight assigned to each transaction account of the synthetic control group is further based on a respective predictive spending score of the transaction account.

Clause 7: The computer-implemented method of any of clauses 1-6, wherein the at least one operational parameter of a computer-implemented advertisement program comprises at least one of: number of communications to be transmitted; time of communications to be transmitted; list of addresses of communications to be transmitted; or any combination thereof.

Clause 8: The computer-implemented method of any of clauses 1-7, wherein an allocation of computing resources of the computer-implemented advertisement program is based at least partly on the at least one operational parameter.

Clause 9: A system comprising a server comprising at least one processor, the server being programmed and/or configured to: receive transaction account data of a plurality of transaction accounts in a first time period; receive, via a transaction service provider system, transaction data associated with at least one transaction completed by a first set of transaction accounts of the plurality of transaction accounts with at least one target merchant in a second time period; generate a synthetic control group comprising a subset of transaction accounts sampled from the first set of transaction accounts; determine, using a machine learning model, for each transaction account of the synthetic control group, a propensity score representative of a likelihood of being associated with a test group; assign, based at least partly on the propensity score of each transaction account and historic transaction data, an entropy balancing weight to each transaction account of the synthetic control group; and alter, based on the transaction data and the synthetic control group, at least one operational parameter of a computer-implemented advertisement program to be executed in a third time period.

Clause 10: The system of clause 9, wherein the entropy balancing weight assigned to each transaction account of the synthetic control group is further based on a respective propensity score of the transaction account.

Clause 11: The system of clause 9 or clause 10, wherein the propensity score is further determined, using a machine learning model, for each transaction account of the test group.

Clause 12: The system of any of clauses 9-11, wherein the server is further programmed and/or configured to determine, using a machine learning model, for each transaction account of the synthetic control group and the test group, a predictive spending score for the third time period.

Clause 13: The system of any of clauses 9-12, wherein the entropy balancing weight assigned to each transaction account of the synthetic control group is further based on a respective predictive spending score of the transaction account.

Clause 14: The system of any of clauses 9-13, wherein the at least one operational parameter of a computer-implemented advertisement program comprises at least one of: number of communications to be transmitted; time of communications to be transmitted; list of addresses of communications to be transmitted; or any combination thereof; and wherein an allocation of computing resources of the computer-implemented advertisement program is based at least partly on the at least one operational parameter.

Clause 15: A computer program product comprising at least one non-transitory computer-readable medium including program instructions that, when executed by at least one processor, cause the at least one processor to: receive transaction account data of a plurality of transaction accounts in a first time period; receive, via a transaction service provider system, transaction data associated with at least one transaction completed by a first set of transaction accounts of the plurality of transaction accounts with at least one target merchant in a second time period; generate a synthetic control group comprising a subset of transaction accounts sampled from the first set of transaction accounts; determine, using a machine learning model, for each transaction account of the synthetic control group, a propensity score representative of a likelihood of being associated with a test group; assign, based at least partly on the propensity score of each transaction account and historic transaction data, an entropy balancing weight to each transaction account of the synthetic control group; and alter, based on the transaction data and the synthetic control group, at least one operational parameter of a computer-implemented advertisement program to be executed in a third time period.

Clause 16: The computer program product of clause 15, wherein the entropy balancing weight assigned to each transaction account of the synthetic control group is further based on a respective propensity score of the transaction account.

Clause 17: The computer program product of clause 15 or clause 16, wherein the propensity score is further determined, using a machine learning model, for each transaction account of the test group.

Clause 18: The computer program product of any of clauses 15-17, wherein the program instructions further cause the at least one processor to determine, using a machine learning model, for each transaction account of the synthetic control group and the test group, a predictive spending score for the third time period.

Clause 19: The computer program product of any of clauses 15-18, wherein the entropy balancing weight assigned to each transaction account of the synthetic control group is further based on a respective predictive spending score of the transaction account.

Clause 20: The computer program product of any of clauses 15-19, wherein the at least one operational parameter of a computer-implemented advertisement program comprises at least one of: number of communications to be transmitted; time of communications to be transmitted; list of addresses of communications to be transmitted; or any combination thereof; and wherein an allocation of computing resources of the computer-implemented advertisement program is based at least partly on the at least one operational parameter.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partly on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet, and/or the like) that includes data. Any known electronic communication protocols and/or algorithms may be used such as, for example, transmission control protocol/internet protocol (TCP/IP) (including hypertext transfer protocol (HTTP) and other protocols), wireless local area network (WLAN) (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX®), etc.), and/or the like. It will be appreciated that numerous other arrangements are possible.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS ("point-ofsale") system, and/or any other device or system capable of communicating with a network.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments or aspects, may be operated by or on behalf of a transaction service provider.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "server" or "server computer" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a cloud provider system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Some non-limiting embodiments or aspects of the present disclosure are directed to a system and method of generating a synthetic control group, including for the systematic refinement of computer-implemented advertisement programs. Rather than dedicating additional computer resources (e.g., processing capacity, memory space, etc.) to identifying and tracking separate experimental and control groups in pre-exposure (e.g., pre-implementation) trends, the described synthetic control methods estimate what would have happened to the experimental group had it not been exposed to the communications. The described synthetic control methods provide a systematic way to choose comparison accounts in comparative case studies. Systematization allows for precise quantitative inference in small-sample comparative studies, while also allowing for the application of qualitative analysis. Moreover, fewer observational points are required, thereby increasing computer and network efficiency in analysis. The described synthetic control methods provide feedback when there is a small number of exposed accounts and control accounts and it may not require parallel pre-implementation trends like difference in differences (DID) techniques. There are further time savings and improvements in accuracy by generating a synthetic control group that resembles the same pool of transaction accounts as the test group, but without independent control group tracking as with DID techniques.

Figure 1:
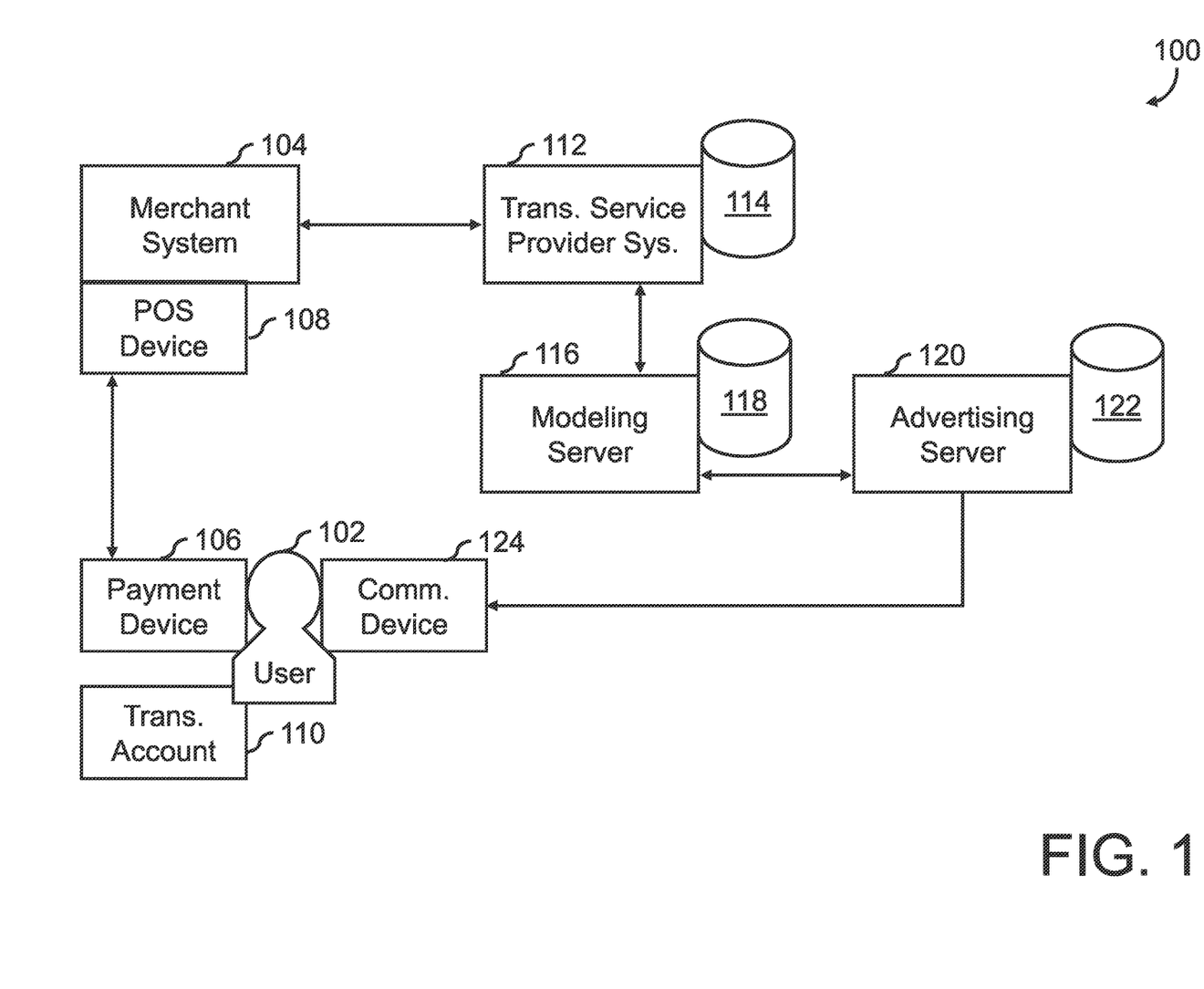
FIG. 1 is a schematic diagram of one embodiment or aspect of a system and method for generating a synthetic control group.

With specific reference to FIG. 1, and in some non-limiting embodiments or aspects, provided is a system 100 for generating a synthetic control group. The system 100 includes a merchant system 104 that may include a point-of-sale (POS) device 108. One or more users 102 having one or more payment devices 106 may interact with and complete transactions with merchants via POS devices 108. A payment device 106 may be associated with a transaction account 110. A transaction account 110 may be an issuer account from which funds may be drawn by a payment device 106, such as a debit account, a credit account, an interest-bearing savings account, and/or the like. A merchant system 104 may be communicatively connected to a transaction service provider system 112 to complete the processing of transactions initiated between a payment device 106 and a POS device 108.

The transaction service provider system 112 may include and/or be associated with a transaction database 114, which may store transaction data, transaction account data, and/or the like. The system 100 may further include a modeling server 116 that may include and/or be associated with a model database 118. The model database 118 may be the same database as the transaction database 114. The system may further include an advertising server 120, for execution of a computer-implemented advertisement program (e.g., for sending automatic communications of electronic offers, coupons, rewards, incentives, and/or the like). The advertising server 120 may include and/or be associated with an advertisement database 122. The advertisement database 122 may be the same database as the model database 118 and/or the transaction database 114. The user 102 may be associated with a communication device 124 that is configured to receive communications (e.g., emails, texts, voice messages, application messages, notifications, etc.) from the advertising server 120. The transaction service provider system 112 may include the modeling server 116 and/or the advertising server 120, and the modeling server 116 and the advertising server 120 may be a same server.

Figure 2:
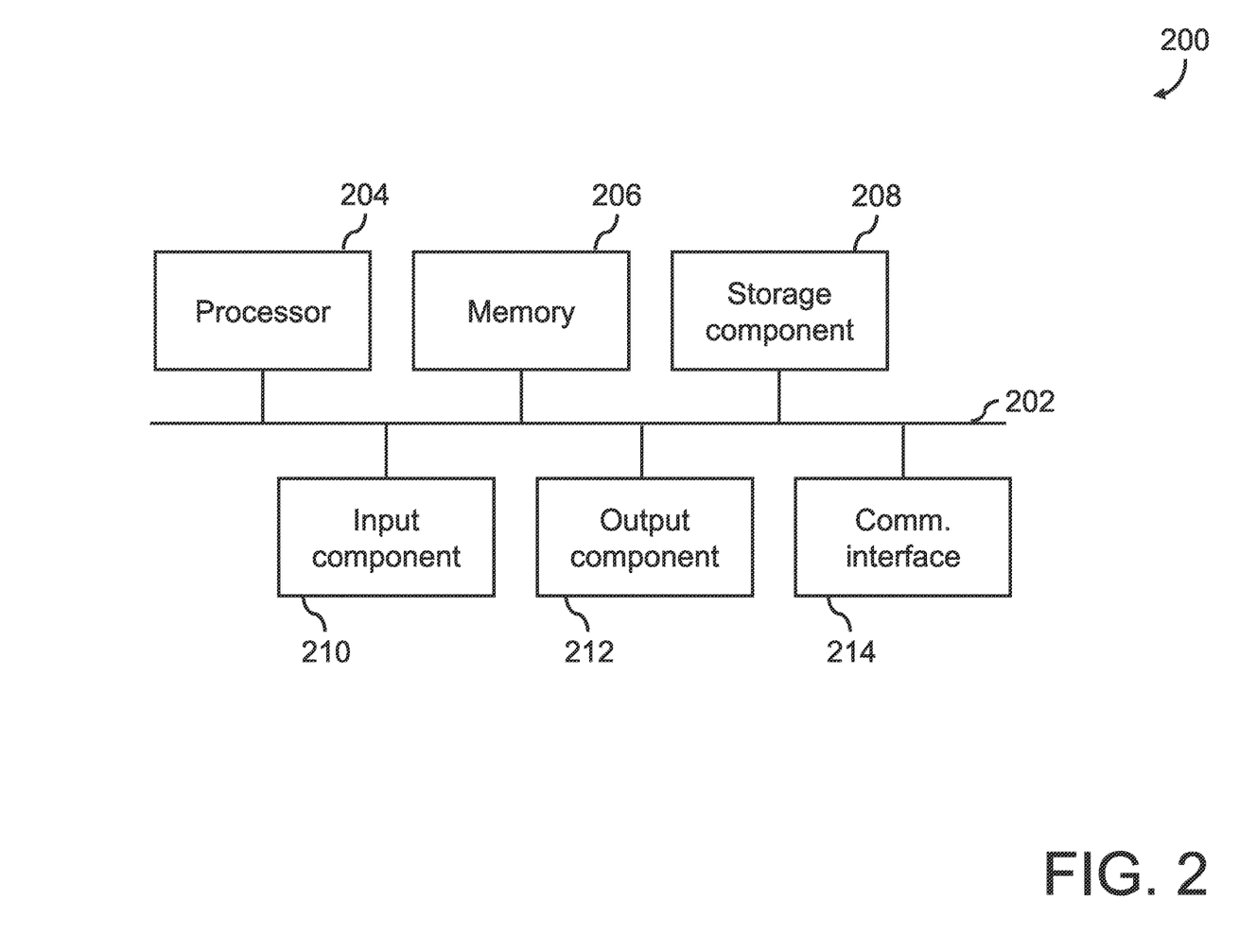
FIG. 2 is a schematic diagram of one embodiment or aspect of a computing device for use with a system and method for generating a synthetic control group.

The transaction service provider system 112 and/or modeling server 116 may receive transaction account data of a plurality of transaction accounts 110 in a first time period. Transaction account data may include, but is not limited to, for each transaction account: transaction history, user data, transaction account identifier, one or more payment device identifiers, and/or the like. Transaction account data may be stored in a transaction database 114 and/or a model database 118. The transaction service provider system 112 may receive transaction data associated with one or more transactions With specific reference to FIG. 2, and in some non-limiting embodiments or aspects, illustrated is a diagram of example components of computing device 200. Computing device 200 may correspond to one or more devices of merchant system 104, payment device 106, POS device 108, transaction service provider system 112, modeling server 116, advertising server 120, and/or communication device 124. In some non-limiting embodiments or aspects, one or more devices of the foregoing may include at least one computing device 200 and/or at least one component of computing device 200. As shown in FIG. 2, computing device 200 may include bus 202, processor 204, memory 206, storage component 208, input component 210, output component 212, and communication interface 214.

Bus 202 may include a component that permits communication among the components of computing device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits computing device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from computing device 200 (e.g., a display, a speaker, one or more light-emitting diodes (LEDs), etc.).

Communication interface 214 may include a transceiver-like component (e.g., a transceiver, a separate receiver and transmitter, etc.) that enables computing device 200 to communicate with other devices, such as via a wired connection, a wireless connection, or a combination of wired and wireless connections. Communication interface 214 may permit computing device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Computing device 200 may perform one or more processes described herein. Computing device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Computing device 200 may be capable of receiving information from, storing information in, communicating information to, or searching information stored in the data storage or one or more data structures in memory 206 and/or storage component 208. For example, the information may include encryption data, input data, output data, transaction data, transaction account data, or any combination thereof.

The number and arrangement of components shown in FIG. 2 are provided as an example. In some non-limiting embodiments or aspects, computing device 200 may include additional components, fewer components, different components, or differently arranged components than those shown in FIG. 2. Additionally or alternatively, a set of components (e.g., one or more components) of computing device 200 may perform one or more functions described as being performed by another set of components of computing device 200.

Figure 3:
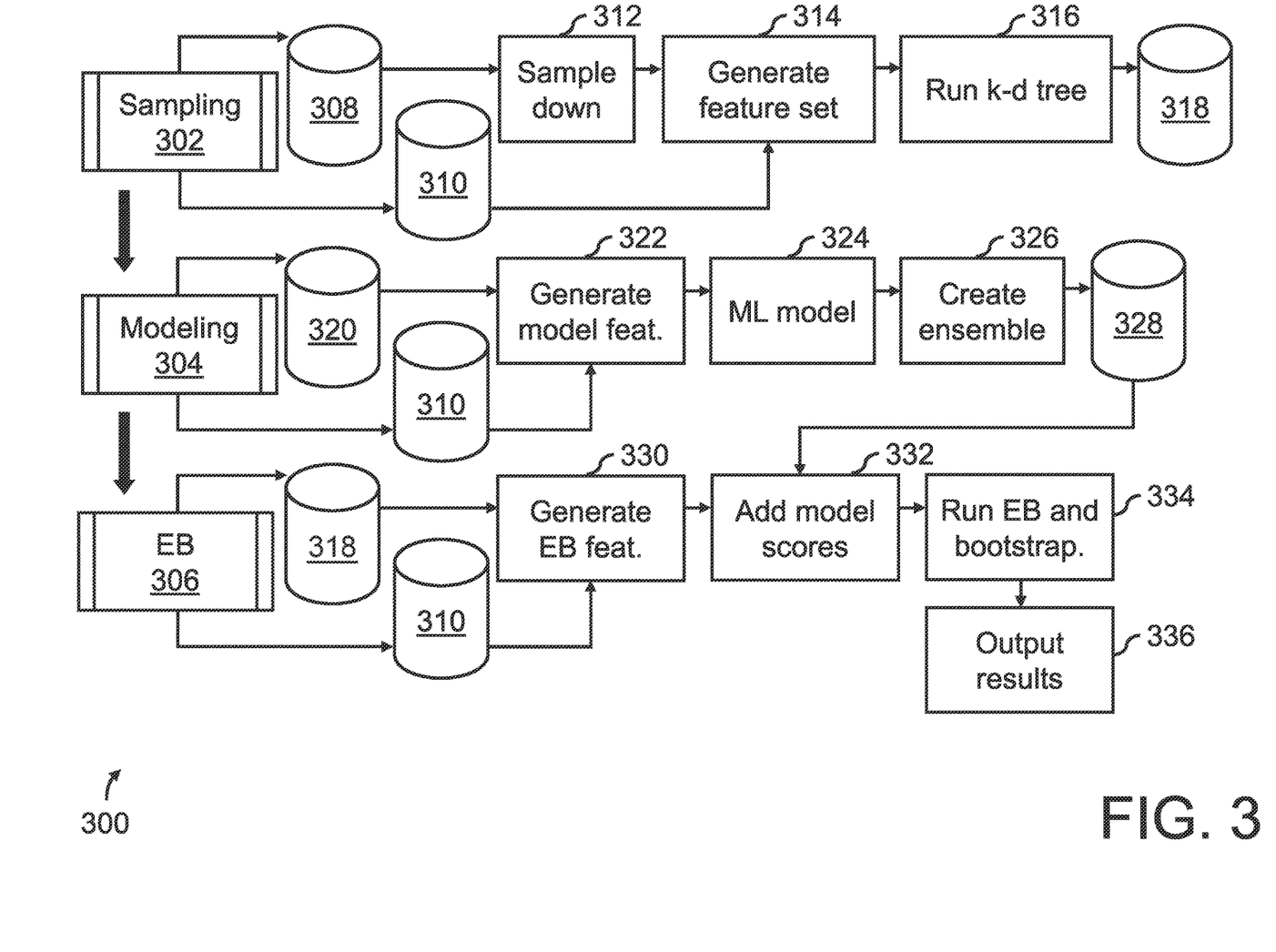
FIG. 3 is an operational diagram of one embodiment or aspect of a system and method for generating a synthetic control group.

With specific reference to FIG. 3, and in some non-limiting embodiments or aspects, provided is a method 300 for generating a synthetic control group. Steps of the method 300 may be carried out by a transaction service provider system 112, a modeling server 116, an advertising server 120, another server, or a combination thereof. The method 300 includes a sampling phase 302. As used herein, "phase" may refer to one or more steps of a computer-implemented method. One phase may include some or all of the steps of another phase. In the sampling phase 302, a modeling server may generate a synthetic control group 318 (e.g., a control group pool). A synthetic control group 318 may include active transaction accounts (e.g., a transaction account having one or more transactions with a target merchant within a sample time period) of a population of all transaction accounts 308. The synthetic control group 318 may include non-active transaction accounts. Different models may be built for active transaction accounts and non-active transaction accounts. The number of active accounts in a synthetic control group may be capped (e.g., limited to million unique accounts) in sample down step 312.

The synthetic control group 318 may include non-active transaction accounts, which may be randomly selected by a modeling server, such as with a k-d tree technique. The population size of a synthetic control group 318 of non-active transaction accounts may be set equal to twice the number of non-active transaction accounts in the exposed population 310 of transaction accounts. A modeling server may generate a feature set for a k-d tree technique, in step 314, using an exposed population 310 of transaction accounts. In step 316, the modeling server may run the k-d tree technique, selecting two nearest neighbors of non-active transaction accounts for every exposed transaction account. The sampling phase 302 yields a synthetic control group 318.

The method 300 may further include a modeling phase 304. For each transaction account in the experimental group and synthetic control group 318, the modeling server may calculate a propensity score, creating a collection of propensity scores 328. The propensity score may represent a likelihood (e.g., probability) that a given transaction account was in the test group (e.g., exposed population 310). The propensity score may be a binary flag, e.g., designating a transaction being in or out of a test group. In doing so, the modeling server may account for biases in the exposed population 310 and further identify transaction accounts in the synthetic control group 318 that are similar to transaction accounts in the exposed population 310 (e.g., test group). With reference to a total population of transaction accounts 320 that excludes the synthetic control group 318, and with reference to the exposed population 310 of transaction accounts, the modeling server may generate features for model building in step 322. In step 324, the modeling server may execute one or more machine learning models (e.g., gradient boosting decision tree) to determine the propensity of a transaction account to be in the test group (e.g., exposed population 310). In such a gradient boosting decision tree model, the dependent variable may be a binary flag indicative of being in or out of the test group. Independent variables may include, but are not limited to: a spending contribution associated with one or more merchant category codes; spending contribution associated with executive market segments; spending contribution across one or more purchase channels; total spending at merchant (e.g., subject of advertisement); total spending; or any combination thereof. In step 326, the modeling server may generate an ensemble of models to aggregate the prediction of each base model in step 324. The modeling phase 304 may yield a collection of propensity scores 328 for the transaction accounts in the synthetic control group 318 and transaction accounts in the exposed population 310.

The method 300 may further include a prediction phase (not shown). In the prediction phase, the modeling server may balance for future predicted spending at a merchant. To do this, the modeling server may score the transaction accounts from the exposed population 310 and the synthetic control group 318 using machine learning models built to predict future merchant spending, such as by using historical spending attributes and payment device holder characteristics. In one non-limiting embodiment or aspect, the modeling server may use a random forest model for the prediction phase. The dependent variable of the random forest model may be a spending amount at a merchant in a specified future time period (e.g., an attribution window to be measured). Independent variables of the random forest model may include, but are not limited to: payment device time since issuance; affluence indicator; distance to merchant; amount spent at merchant by month; amount spent at one or more merchant category codes; total spending; average monthly spending; average monthly transaction count; or any combination thereof.

The method 300 may further include an entropy balancing phase 306. The modeling server may balance the samples using multivariate reweighting methodology. In doing so, the modeling server may calculate a weight for every transaction account in the synthetic control group 318, which may result in a population that is balanced for key attributes compared to the exposed population 310. Entropy balancing variables may include, but are not limited to: propensity score; predictive score; card-present spending amount (e.g., total, at a merchant, etc.); card-not-present spending amount (e.g., total, at a merchant, etc.); card-present transaction count (e.g., total, at a merchant, etc.); card-not-present transaction count (e.g., total, at a merchant, etc.); total spending amount; total transaction count; spending amount in related market; transaction count in related market; or any combination thereof. The modeling server may generate features for entropy balancing in step 330, add propensity scores 328 from the modeling phase 304 to the entropy balancing weighting in step 332, run entropy balancing and bootstrapping in step 334, and output results in step 336.

In step 334, a modeling server may execute a bootstrapping process to generate uncertainty ranges and/or confidence intervals for statistical analysis. In a bootstrapping process, a modeling server may repeatedly sample subsets from a population of transaction accounts (e.g., according to the Central Limit Theorem), compute a sample population statistic (e.g., statistical mean), and produce a Gaussian distribution from the sampled subsets. Given that transaction data generally may not yield parametric distributions, from which confidence intervals may be derived for further statistical analysis, the modeling server may utilize bootstrapping to generate a parametric distribution (e.g., a bell-shaped curve). For example, the modeling server may execute one hundred random draws from the synthetic control group or test group of transaction accounts, calculate statistical means, store the means in an array, sort the means in ascending order, and generate confidence intervals from the sorted array.

In some non-limiting embodiments or aspects, in step 334, the modeling server may run an entropy balancing process using the test group (size=M) and synthetic control group (size=N) to obtain a reweighted synthetic control group. The modeling server may generate a table (T, of size=K=M+N) from the union of the test group and synthetic control group, weighting transaction accounts of the synthetic control group and demarcating transaction accounts with a binary flag (e.g., 1=exposed transaction account, 0=control group). The modeling server may sample with replacement (sample size=K) from the table (T), compute metrics for transaction accounts of the test group and the synthetic control group (e.g., total spending amount, average spending amount, etc.), and compute metrics using the predetermined weighting for transaction accounts in the synthetic control group and a weight of 1 for transaction accounts of the test group. In doing so, the modeling server may generate a vector (size=n) of bootstrapped samples, calculate a median and one or more other statistical metrics (to add to output results), and determine confidence intervals (e.g., 95% confidence intervals).

Once the entropy balancing phase 306 is complete, the output results step 336 yields a synthetic control group that is balanced. Additional dimensions and metrics may be analyzed based on the reweighted synthetic control group, including, but not limited to: purchase channel (e.g., card-present transactions, card-not-present transactions, etc.); customer segment (e.g., existing spenders, new spenders, etc.); incremental sales lift (e.g., percent change, value change); confidence interval (e.g., percent confidence); change in response rate; change in average spending per subject (e.g., per transaction account, per payment device, per payment device holder, etc.). Differences in synthetic control group behavior from test group behavior in a second time period may be attributed to the influence of a computer-implemented advertising campaign, and operational parameters thereof may be altered accordingly to increase user reactivity, reduce computer resources required for the campaign, improve efficiency of network traffic, and/or the like.

Figure 4:
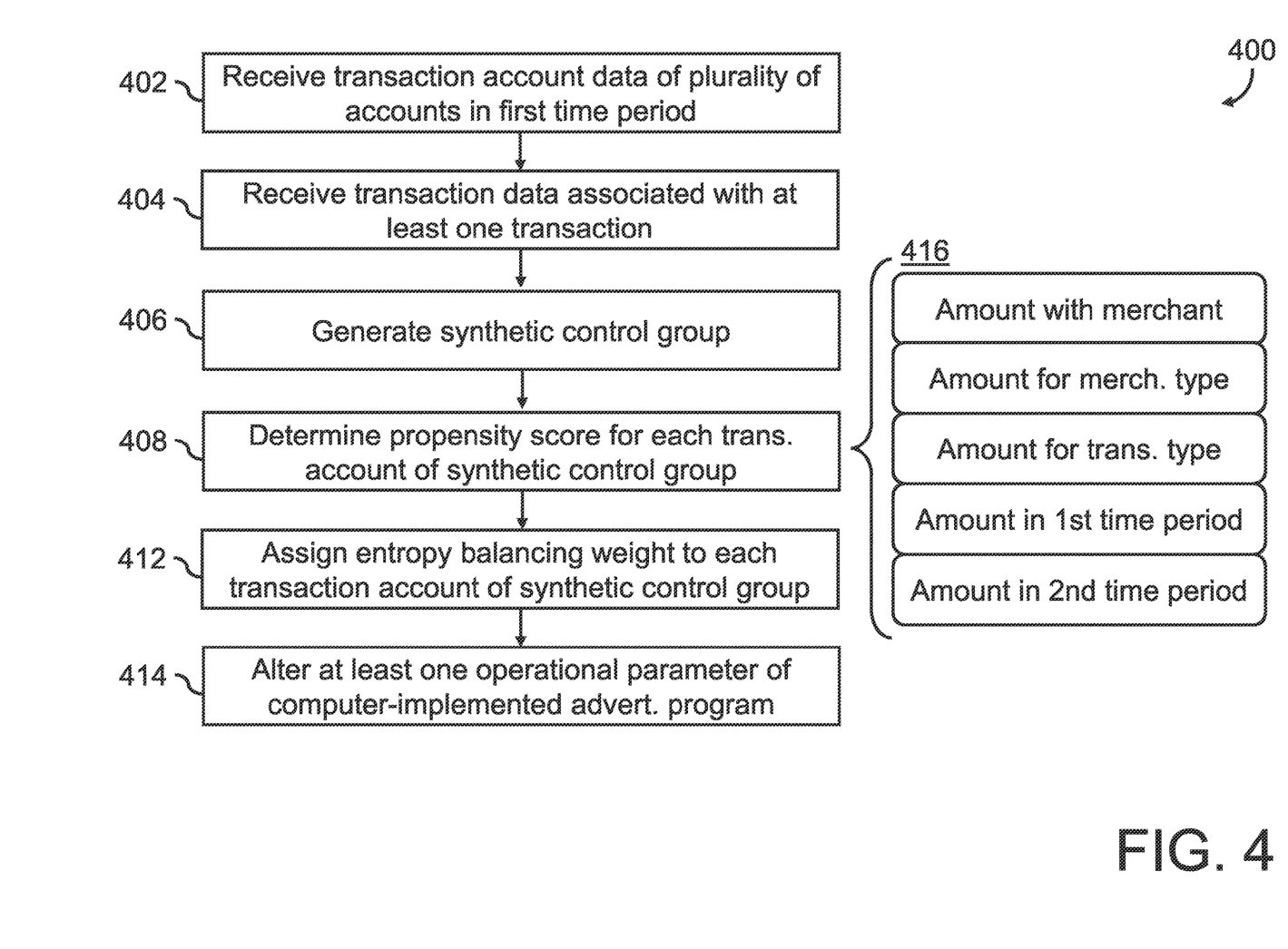
FIG. 4 is a flow diagram of one embodiment or aspect of a system and method for generating a synthetic control group.

With specific reference to FIG. 4, and in some non-limiting embodiments or aspects, illustrated is a method 400 of generating a synthetic control group. One or more steps of the method 400 may be executed by one or more processors of a transaction service provider system 112, a modeling server 116, an advertising server 120, another server, or a combination thereof. In step 402, the modeling server may receive transaction account data of a plurality of transaction accounts in a first time period (e.g., preceding period of twelve months). In step 404, the modeling server may receive, via a transaction service provider system, transaction data associated with at least one transaction completed by a first set of transaction accounts (e.g., set of one or more transaction accounts) with at least one target merchant in a second time period (e.g., same or different time period as the first time period). The target merchant may be a merchant for which a computer-implemented advertisement program was initiated, such that transaction account holders were sent a communication regarding the target merchant.

In step 406, the modeling server may generate a synthetic control group including a subset of transaction accounts sampled from the first set of transaction accounts. The subset of transaction accounts may or may not include transaction accounts that had transactions with the target merchant in the first or second time period. In step 408, the modeling server may determine, using a machine learning model, for each transaction account of the synthetic control group, a propensity score representative of a likelihood of being associated with a test group. The propensity score may include a value, such as a percentage likelihood. The propensity score may include a binary output. The propensity score may be based on a number of historical transaction data metrics 416, including, but not limited to: amount transacted with a merchant (e.g., target merchant); amount transacted for merchant type (e.g., merchant type of target merchant); amount transacted for transaction type; amount transacted in the first time period; amount transacted in the second time period; or any combination thereof. In step 408, a propensity score may also be generated for each transaction account of the test group. A higher propensity score of a transaction account of a synthetic control group may indicate that the transaction account is similar to the accounts of the test group, which indicates a stronger synthetic control group.

In step 412, the modeling server may assign an entropy balancing weight to each transaction account of the synthetic control group based at least partly on historic transaction data. In step 412, the modeling server may also assign an entropy balancing weight to each transaction account of the test group. The entropy balancing weight assigned to each transaction account of the synthetic control group or the test group may be based on a respective propensity score of the transaction account (e.g., to favor higher propensity scores, propensity scores indicating a greater likelihood of being associated with test group, etc.). In step 414, the modeling server may alter at least one operational parameter of a computer-implemented advertising program to be executed in a third time period. Operational parameters may include, but are not limited to: number of communications to be transmitted; time of communications to be transmitted; list of addresses of communications to be transmitted; or any combination thereof. In step 414, an allocation of computing resources (e.g., hardware/software configuration of processing capacity, memory space, bandwidth, etc.) of the computer-implemented advertisement program may be based at least partly on the at least one operational parameter (e.g., to be set by an advertising server). For example, the number of network communications to be sent in a third time period for the advertisement campaign may determine a proportional amount of processing capacity and memory storage space required. In another example, the time of communications to be transmitted may determine which computer resources are to be made operational for carrying out the computer-implemented advertisement program, such as based on server uptime.

Figure 5:
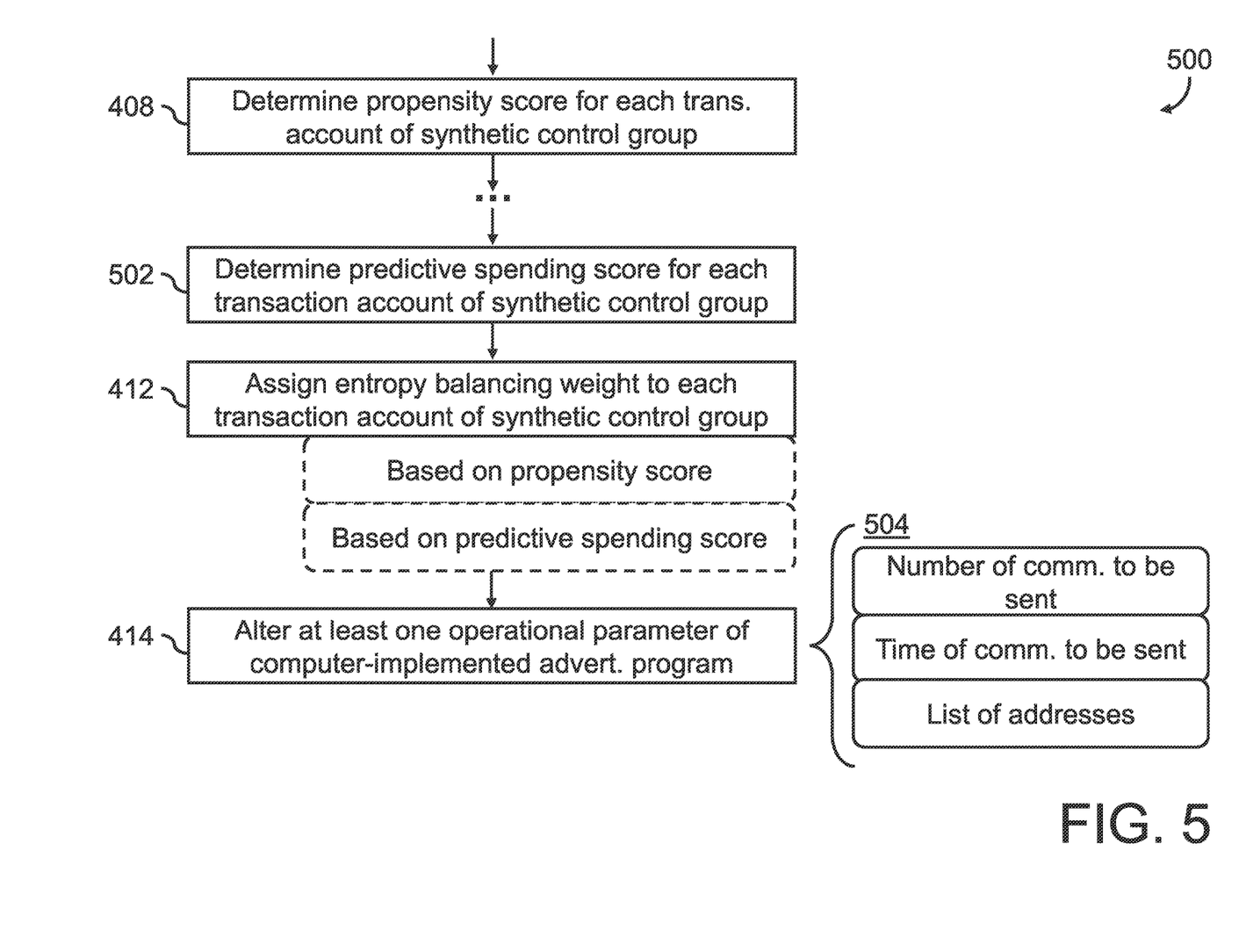
FIG. 5 is a flow diagram of one embodiment or aspect of a system and method for generating a synthetic control group.

With specific reference to FIG. 5, and in some non-limiting embodiments or aspects, illustrated is a method 500 of generating a synthetic control group. One or more steps of the method 500 may be executed by one or more processors of a transaction service provider system 112, a modeling server 116, an advertising server 120, another server, or a combination thereof. The modeling server may determine a propensity score for each transaction account of the synthetic control group in step 408. The modeling server may also determine a predictive spending score for each transaction account of the synthetic control group, in step 502. Additionally, the modeling server may determine a predictive spending score for each transaction account of the test group in step 502. To determine a predictive spending score, a machine learning model (e.g., random forest technique) may be employed by the modeling server to determine an amount of spending at a merchant for a time period in the future. When the modeling server assigns an entropy balancing weight to each transaction of the synthetic control group and/or test group, the weight may be based on the propensity score and/or the predictive spending score. Thereafter, the modeling server may alter one or more operational parameters 504 of the computer-implemented advertising program, in step 414, which may include, but are not limited to: number of communications to be sent; time of communications to be sent; list of address of communications to be sent; or any combination thereof.

Although the disclosure has been described in detail for the purpose of illustration based on what is currently considered to be the most practical and non-limiting embodiments or aspects, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:
   after at least one holder of at least one transaction account of a plurality of transaction accounts is exposed to at least one communication via a computer-implemented advertisement program in a first time period, receiving, with at least one processor, transaction data associated with at least one transaction completed by a first set of transaction accounts of the plurality of transaction accounts with at least one target merchant in the first time period, the transaction data generated by a transaction service provider system from processing the at least one transaction;
   generating, with the at least one processor, a synthetic control group comprising a subset of transaction accounts sampled from the first set of transaction accounts;
   determining, with the at least one processor, for each transaction account of the synthetic control group, a propensity score representative of a likelihood of said transaction account being associated with a test group using a first machine learning model, wherein holders of transaction accounts in the test group were exposed to the at least one communication;
   determining, with the at least one processor, for each transaction account of the synthetic control group, a predictive spending score for a second time period using a second machine learning model;
   balancing, with the at least one processor, the synthetic control group, wherein balancing the synthetic control group comprises:
     assigning an entropy balancing weight to each transaction account of the synthetic control group based at least partly on historic transaction data, the propensity score of each transaction account of the synthetic control group, and the predictive spending score of each transaction account of the synthetic control group;
   reducing, with the at least one processor, computing resources required for the computer-implemented advertisement program in the second time period subsequent the first time period by altering at least one operational parameter of the computer-implemented advertisement program based on the transaction data and the synthetic control group, wherein the at least one operational parameter comprises a time of communications to be transmitted; and
   executing, with the at least one processor, the computer-implemented advertisement program in the second time period based on the at least one operational parameter that was altered, wherein executing the computer-implemented advertisement program comprises:
     allocating a reduced amount of processing capacity and memory storage space to execute the computer-implemented advertisement program based on the at least one operational parameter that was altered and further based on server uptime.

2. The computer-implemented method of claim 1, wherein determining the propensity score for each transaction account of the synthetic control group is based on at least one of:
   an amount transacted with merchant;
   an amount transacted for merchant type;
   an amount transacted for transaction type;
   an amount transacted in the first time period;
   or any combination thereof.

3. The computer-implemented method of claim 1, further comprising determining, with the at least one processor, a value of the entropy balancing weight assigned to each transaction account of the synthetic control group based on a respective propensity score of the transaction account.

4. The computer-implemented method of claim 3, wherein the propensity score is further determined, with the at least one processor, for each transaction account of the synthetic control group using the first machine learning model.

5. The computer-implemented method of claim 1, wherein the second machine learning model is configured to output the predictive spending score based on a predicted amount of spending at a merchant for a future time period.

6. The computer-implemented method of claim 5, further comprising determining, with the at least one processor, a value of the entropy balancing weight assigned to each transaction account of the synthetic control group further based on a respective predictive spending score of the transaction account.

7. The computer-implemented method of claim 1, wherein the at least one operational parameter further comprises a number of communications to be transmitted.

8. The computer-implemented method of claim 7, wherein the at least one operational parameter of the computer-implemented advertisement program further comprises a list of addresses of communications to be transmitted.

9. A system comprising a server comprising at least one processor, the server being programmed and/or configured to:
   after at least one holder of at least one transaction account of a plurality of transaction accounts is exposed to at least one communication via a computer-implemented advertisement program in a first time period, receive transaction data associated with at least one transaction completed by a first set of transaction accounts of the plurality of transaction accounts with at least one target merchant in a first time period, the transaction data generated by a transaction service provider system from processing the at least one transaction;
   generate a synthetic control group comprising a subset of transaction accounts sampled from the first set of transaction accounts;
   determine, for each transaction account of the synthetic control group, a propensity score representative of a likelihood of said transaction account being associated with a test group using a first machine learning model, wherein holders of transaction accounts in the test group were exposed to the at least one communication;
   determine, for each transaction account of the synthetic control group, a predictive spending score for a second time period using a second machine learning model;
   balance the synthetic control group, wherein, while balancing the synthetic control group, the server is programmed and/or configured to:
     assign an entropy balancing weight to each transaction account of the synthetic control group based at least partly on historic transaction data, the propensity score of each transaction account of the synthetic control group, and the predictive spending score of each transaction account of the synthetic control group;

reduce computing resources required for the computer-implemented advertisement program in the second time period subsequent the first time period by altering at least one operational parameter of the computer-implemented advertisement program based on the transaction data and the synthetic control group, wherein the at least one operational parameter comprises a time of communications to be transmitted; and execute the computer-implemented advertisement program in the second time period based on the at least one operational parameter that was altered, wherein, while executing the computer-implemented advertisement program, the server is programmed and/or configured to:

allocate a reduced amount of processing capacity and memory storage space to execute the computer-implemented advertisement program based on the at least one operational parameter that was altered and further based on server uptime.

10. The system of claim 9, wherein the server is further programmed and/or configured to determine a value of the entropy balancing weight assigned to each transaction account of the synthetic control group based on a respective propensity score of the transaction account.

11. The system of claim 10, wherein the propensity score is further determined for each transaction account of the synthetic control group using the first machine learning model.

12. The system of claim 9, wherein the second machine learning model is configured to output the predictive spending score based on a predicted amount of spending at a merchant for a future time period.

13. The system of claim 12, wherein the server is further programmed and/or configured to determine a value of the entropy balancing weight assigned to each transaction account of the synthetic control group further based on a respective predictive spending score of the transaction account.

14. The system of claim 9, wherein the at least one operational parameter of the computer-implemented advertisement program further comprises a number of communications to be transmitted.

15. A computer program product comprising at least one non-transitory computer-readable medium including program instructions that, when executed by at least one processor, cause the at least one processor to:

after at least one holder of at least one transaction account of a plurality of transaction accounts is exposed to at least one communication via a computer-implemented advertisement program in a first time period, receive transaction data associated with at least one transaction completed by a first set of transaction accounts of the plurality of transaction accounts with at least one target merchant in a first time period, the transaction data generated by a transaction service provider system from processing the at least one transaction;

generate a synthetic control group comprising a subset of transaction accounts sampled from the first set of transaction accounts;

determine, for each transaction account of the synthetic control group, a propensity score representative of a likelihood of said transaction account being associated with a test group using a first machine learning model, wherein holders of transaction accounts in the test group were exposed to the at least one communication;

determine, for each transaction account of the synthetic control group, a predictive spending score for a second time period using a second machine learning model;

balance the synthetic control group, wherein the program instructions that cause the at least one processor to balance the synthetic control group cause the at least one processor to:

assign an entropy balancing weight to each transaction account of the synthetic control group based at least partly on historic transaction data, the propensity score of each transaction account of the synthetic control group, and the predictive spending score of each transaction account of the synthetic control group;

reduce computing resources required for the computer-implemented advertisement program in the second time period subsequent the first time period by altering at least one operational parameter of the computer-implemented advertisement program based on the transaction data and the synthetic control group, wherein the at least one operational parameter comprises a time of communications to be transmitted; and execute the computer-implemented advertisement program in the second time period based on the at least one operational parameter that was altered, wherein the program instructions that cause the at least one processor to execute the computer-implemented advertisement program cause the at least one processor to:

allocate a reduced amount of processing capacity and memory storage space to execute the computer-implemented advertisement program based on the at least one operational parameter that was altered and further based on server uptime.

16. The computer program product of claim 15, wherein the program instructions further cause the at least one processor to determine a value of the entropy balancing weight assigned to each transaction account of the synthetic control group based on a respective propensity score of the transaction account.

17. The computer program product of claim 16, wherein the propensity score is further determined for each transaction account of the synthetic control group using the first machine learning model.

18. The computer program product of claim 15, wherein the second machine learning model is configured to output the predictive spending score based on a predicted amount of spending at a merchant for a future time period.

19. The computer program product of claim 18, wherein the program instructions further cause the at least one processor to determine a value of the entropy balancing weight assigned to each transaction account of the synthetic control group further based on a respective predictive spending score of the transaction account.

20. The computer program product of claim 15, wherein the at least one operational parameter of the computer-implemented advertisement program further comprises a number of communications to be transmitted.

* * * * *